United States Patent
Shih et al.

(10) Patent No.: US 7,709,412 B2
(45) Date of Patent: May 4, 2010

(54) BULK METAL HYDROTREATING CATALYST USED IN THE PRODUCTION OF LOW SULFUR DIESEL FUELS

(75) Inventors: Stuart S. Shih, Gainesville, VA (US); Stuart L. Soled, Pittstown, NJ (US); Sabato Miseo, Pittstown, NJ (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 727 days.

(21) Appl. No.: 11/096,501

(22) Filed: Apr. 1, 2005

(65) Prior Publication Data

US 2005/0277545 A1    Dec. 15, 2005

Related U.S. Application Data

(60) Provisional application No. 60/564,407, filed on Apr. 22, 2004.

(51) Int. Cl.
*B01J 23/16*    (2006.01)
*B01J 23/20*    (2006.01)
*B01J 23/28*    (2006.01)
*B01J 23/75*    (2006.01)
*C10G 45/08*    (2006.01)

(52) U.S. Cl. .......... 502/311; 502/305; 502/314; 502/353; 502/321; 208/46

(58) Field of Classification Search .......... 502/311, 502/321, 326, 305, 314, 353; 208/46
See application file for complete search history.

(56) References Cited

U.S. PATENT DOCUMENTS

| 5,275,994 | A * | 1/1994 | Weissman et al. | 502/171 |
| 6,534,437 | B2 * | 3/2003 | Eijsbouts et al. | 502/313 |
| 2004/0040887 | A1 * | 3/2004 | Simon et al. | 208/16 |

* cited by examiner

Primary Examiner—Ngoc-Yen M Nguyen
Assistant Examiner—Diana J Liao

(57) ABSTRACT

The invention relates to a bulk metal hydrotreating catalyst, suitable for the production of low sulfur diesel fuels, said bulk metal hydrotreating catalyst being in the oxide state and having a composition of $Mo_xCo_yNb_z$, excluding the oxygen, wherein x, y, and z represent about 0.1 to about 2 moles of Mo, about 0.5 to about 2 moles of Co, and about 0.1 to about 2 moles Nb and wherein Nb is present in amounts from about 2 to about 45 wt. %, Mo is present in amounts from about 1 to about 50 wt. %, and Co is present in amounts from about 10 to about 45 wt. %.

16 Claims, 3 Drawing Sheets

US 7,709,412 B2

BULK METAL HYDROTREATING CATALYST USED IN THE PRODUCTION OF LOW SULFUR DIESEL FUELS

CROSS-REFERENCE TO RELATED APPLICATION

This application claims benefit of U.S. Provisional Patent Application Ser. No. 60/564,407 filed Apr. 22, 2004.

FIELD OF THE INVENTION

The instant invention relates to a bulk metal catalyst used for upgrading hydrocarbon feedstreams boiling within the diesel range. More particularly, the instant invention relates to a bulk metal hydrotreating catalyst comprising Co, Mo, and Nb used for hydrotreating diesel boiling range feedstreams to produce low sulfur diesel products.

BACKGROUND OF THE INVENTION

Environmental and regulatory initiatives are requiring ever lower levels of both sulfur and aromatics in distillate fuels. For example, proposed sulfur limits for distillate fuels to be marketed in the European Union for the year 2005 is 50 wppm or less. There are also proposed limits that would require lower levels of total aromatics as well as lower levels of multi-ring aromatics found in distillate fuels and heavier hydrocarbon products. Further, the maximum allowable total aromatics level for CARB reference diesel and Swedish Class I diesel are 10 and 5 vol. %, respectively. Further, the CARB reference fuels allow no more than 1.4 vol. % polyaromatics (PNAs). Consequently, much work is presently being done in the hydrotreating art because of these proposed regulations.

However, as the supply of low sulfur, low nitrogen crudes decreases, refineries are processing crudes with greater sulfur and nitrogen contents at the same time that environmental regulations are mandating lower levels of these heteroatoms in products. Consequently, a need exists for increasingly efficient diesel desulfurization and denitrogenation processes. Therefore, processes and catalysts have been developed to reduce the concentration of sulfur and nitrogen contaminants in these streams.

In one approach, a family of compounds, related to hydrotalcites, e.g., ammonium nickel molybdates, has been prepared as catalysts to be used in such processes. Whereas X-ray diffraction analysis has shown that hydrotalcites are composed of layered phases with positively charged sheets and exchangeable anions located in the galleries between the sheets, the related ammonium nickel molybdate phase has molybdate anions in interlayer galleries bonded to nickel oxyhydroxide sheets. See, for example, Levin, D., Soled, S. L., and Ying, J. Y., Crystal Structure of an Ammonium Nickel Molybdate prepared by *Chemical Precipitation, Inorganic Chemistry*, Vol. 35, No. 14, p. 4191-4197 (1996). The preparation of such materials also has been reported by Teichner and Astier, *Appl. Catal.* 72, 321-29 (1991); *Ann. Chim. Fr.* 12, 337-43 (1987), and *C. R. Acad. Sci.* 304 (II), #11, 563-6 (1987) and Mazzocchia, *Solid State Ionics*, 63-65 (1993) 731-35.

Also, processes to produce fuels to meet the ever more restrictive Environmental regulations, such as hydrotreating, are well known in the art and typically requires treating the petroleum streams with hydrogen in the presence of a supported catalyst at hydrotreating conditions. The catalyst is usually comprised of a Group VI metal with one or more Group VIII metals as promoters on a refractory support. Hydrotreating catalysts that are particularly suitable for hydrodesulfurization, as well as hydrodenitrogenation, generally contain molybdenum or tungsten on alumina promoted with a metal such as cobalt, nickel, iron, or a combination thereof. Cobalt promoted molybdenum on alumina catalysts are most widely used when the limiting specifications are hydrodesulfurization, while nickel promoted molybdenum on alumina catalysts are the most widely used for hydrodenitrogenation, partial aromatic saturation, as well as hydrodesulfurization.

However, there still exists a need in the art for catalysts effective at reducing the sulfur and nitrogen content in diesel boiling range hydrocarbon streams.

SUMMARY OF THE INVENTION

The instant invention is directed at a bulk metal hydrotreating catalyst that is used in the production of low sulfur diesel products. The bulk metal hydrotreating catalyst comprises:
  a) about 0 to about 50 wt. % Co;
  b) about 0 to about 60 wt. % Mo; and
  c) about 0 to about 50 wt. % Nb.

DETAILED DESCRIPTION OF THE INSTANT INVENTION

Figure 1:
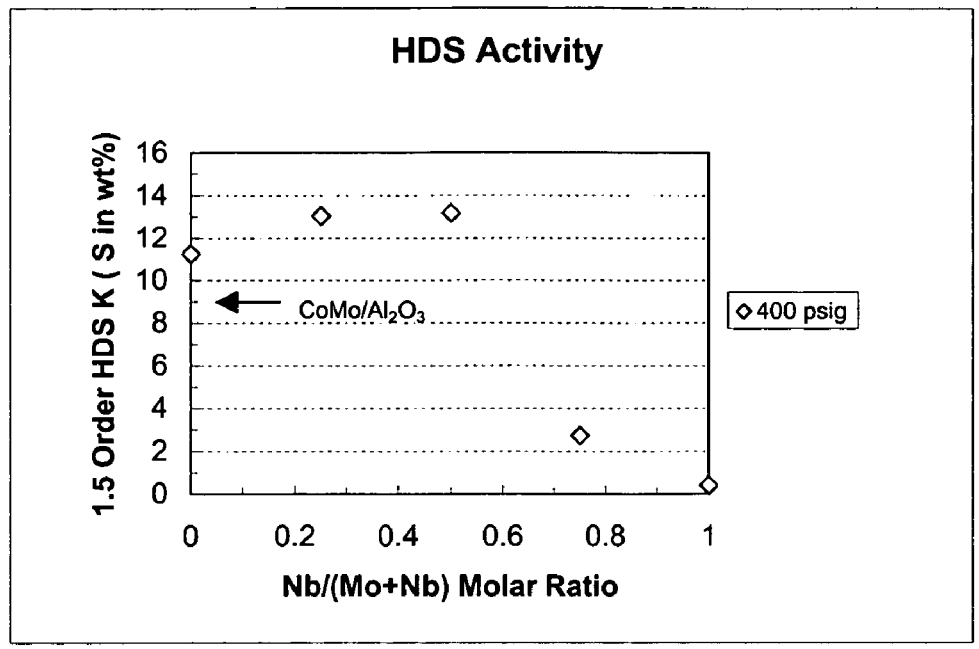
FIG. 1 compares the hydrodesulfurization activity of various CoMoNb bulk hydrotreating catalysts to the hydrodesulfurization activity of a commercial hydrotreating catalyst.

It should be noted that the terms "bulk" and "unsupported" when used in conjunction with the hydrotreating catalysts disclosed herein are synonymous and are sometimes used interchangeably.

The present invention is a bulk metal hydrotreating catalyst used in processes to produce low sulfur diesel products. The catalyst comprises about 0 to about 50 wt. % Co, about 0 to about 60 wt. % Mo, and about 0 to about 50 wt. % Nb. In a typical process utilizing the presently claimed bulk metal hydrotreating catalysts a diesel boiling range feedstream containing organically bound sulfur contaminants is contacted with the above-described bulk metal catalysts in a reaction stage. The contacting of the diesel boiling range feedstream and the hydrotreating catalyst occurs in the presence of a hydrogen-containing treat gas, and the reaction stage is operated under hydrotreating conditions effective at removing at least a portion of the organically bound sulfur contaminants. The contacting of the diesel boiling range feedstream with the bulk metal hydrotreating catalyst produces a liquid diesel boiling range product having a lower concentration of organically bound sulfur contaminants than the diesel boiling range feedstream.

As stated above, the invention disclosed herein is a bulk metal hydrotreating catalyst that is used in the production of low sulfur diesel fuels. By bulk metal, it is meant that the catalysts used in the present invention are unsupported. The catalyst comprises from about 0 to about 50 wt. % Nb, based on the catalyst, preferably about 2 to about 45 wt. %, more preferably about 10 to about 35 wt. %, and most preferably about 15 to about 20 wt. %. The bulk metal hydrotreating catalyst also contains Mo present in amounts ranging from about 0 to about 60 wt. %, based on the catalyst, preferably about 1 to about 50 wt. %, more preferably about 10 to about 40 wt. %, and most preferably about 15 to about 30 wt. %. The bulk metal hydrotreating catalyst also contains Co present in amounts ranging from about 0 to about 50 wt. %, based on the catalyst, preferably about 10 to about 45 wt. %, more preferably about 20 to about 40 wt. %, and most preferably about 30 to about 40 wt. %. Thus, the bulk metal hydrotreating that are disclosed and claimed herein are bulk metal hydrotreating catalysts having the nomenclature CoMoNb wherein each metal is present in amounts specified above. The inventors hereof have unexpectedly discovered that these bulk metal catalysts, when used in hydrotreating diesel boiling range feedstreams, are more active for desulfurization, denitrogenation, and hydrogenation than conventional hydrotreating catalysts.

It is also useful to describe the bulk metal hydrotreating catalysts as having specific molar concentrations of each metal. Therefore, in one embodiment the finished catalysts have the metals concentrations described above and are also described as those bulk metal hydrotreating catalysts in the oxide state having a composition of $Mo_xCo_yNb_z$, excluding the oxygen, wherein x, y, and z describe relative molar quantities. Thus, the bulk metal hydrotreating catalysts used herein comprise about 0.1 to about 2.0 moles Nb, denoted by "z", preferably 0.2 to about 1.5 moles, more preferably about 0.2 to about 0.8 moles. The moles of Mo, denoted by "x", are present in amounts ranging from about 0.1 to about 2 moles, preferably about 0.2 to about 1.5 moles, more preferably about 0.2 to about 0.8 moles. The moles of Co, denoted by "y", are present in amounts ranging from about 0.5 to about 2 moles, preferably about 0.8 to about 1.5 moles, more preferably about 1 to about 1.5 moles. Thus, particularly preferred catalyst compositions comprise CoMoNb having the wt. % and molar concentration of each metal as outlined above.

The bulk metal hydrotreating catalysts disclosed herein can be prepared by any methods known in the catalyst art for forming bulk metal catalysts. Non-limiting examples of these methods include those outlined in Teichner and Astier, *Appl. Catal.* 72, 321-29 (1991); *Ann. Chim. Fr.* 12, 337-43 (1987), and *C. R. Acad. Sci.* 304 (II), #11, 563-6 (1987) and Mazzocchia, *Solid State Ionics,* 63-65 (1993) 731-35, which are hereby incorporated by reference. The bulk metal hydrotreating catalysts used herein are preferably made by reacting insoluble or partially insoluble metal salts of the metals in the presence of a protic liquid. Preferably, at least one of the metal components remains at least partly in the solid state during the entire catalyst making process. It is also preferred that the at least one Group VIII and at least one Group VIB metals comprise from about 50 wt. % to about 100 wt. %, calculated as oxides, of the total weight of the bulk catalyst particles. The preferred methods of making the catalyst compositions used herein are described in more detail in U.S. Pat. No. 6,156,695, U.S. Pat. No. 6,534,437, U.S. Pat. No. 6,162,350, U.S. Pat. No. 6,299,760, and PCT published application WO00/41810, which are incorporated herein by reference for all purposes to the extent that they are not inconsistent with the present invention disclosure and claims. The bulk metal hydrotreating catalyst is preferably sulfided prior to use, and most preferably made by the methods outlined in U.S. Pat. No. 6,534,437 and U.S. Pat. No. 6,162,350.

As stated above, the bulk metal hydrotreating catalysts disclosed herein are typically used in processes to produce low sulfur diesel products. Feedstreams suitable for treatment with the presently disclosed bulk metal catalysts boil within the diesel range. The diesel boiling range includes streams boiling in the range of about 300° F. to about 775° F., preferably about 350° F. to about 750° F., more preferably about 400° F. to about 700° F., most preferably about 450° F. to about 650° F. These include diesel boiling range feedstreams that are not hydrotreated, are a blend of non-hydrotreated diesel boiling range feedstreams, previously hydrotreated diesel boiling range feedstreams, blends of hydrotreated diesel boiling range feedstreams, and blends of non-hydrotreated and hydrotreated diesel boiling range feedstreams.

The diesel boiling range feedstreams suitable for treatment with the presently disclosed bulk metal catalysts also contain nitrogen. Typically, the nitrogen content of such streams is about 50 to about 1000 wppm nitrogen, preferably about 75 to about 800 wppm nitrogen, and more preferably about 100 to about 700 wppm nitrogen. The nitrogen appears as both basic and non-basic nitrogen species. Non-limiting examples of basic nitrogen species may include quinolines and substituted quinolines, and non-limiting examples of non-basic nitrogen species may include carbazoles and substituted carbazoles. The sulfur content of the diesel boiling range feedstream will generally range from about 50 wppm to about 7000 wppm, more typically from about 100 wppm to about 5000 wppm, and most typically from about 100 to about 3000 wppm. The sulfur will usually be present as organically bound sulfur. That is, as sulfur compounds such as simple aliphatic, naphthenic, and aromatic mercaptans, sulfides, di- and polysulfides and the like. Other organically bound sulfur compounds include the class of heterocyclic sulfur compounds such as thiophene, tetrahydrothiophene, benzothiophene and their higher homologs and analogs. Aromatics are typically present in an amount ranging from about 0.05 wt. %, to about 2.5 wt. %, based on the diesel boiling range feedstream.

As stated above, in a typical process utilizing the presently claimed bulk metal hydrotreating catalysts a diesel boiling range feedstream containing organically bound sulfur contaminants is contacted with the above-described bulk metal catalysts in a reaction stage. Hydrogen-containing treat gasses suitable for use in these processes can be comprised of substantially pure hydrogen or can be mixtures of other components typically found in refinery hydrogen streams. It is typically preferred that the hydrogen-containing treat gas stream contains little, more preferably no, hydrogen sulfide. The hydrogen-containing treat gas purity should be at least about 50% by volume hydrogen, preferably at least about 75% by volume hydrogen, and more preferably at least about 90% by volume hydrogen for best results. It is most preferred that the hydrogen-containing stream be substantially pure hydrogen.

The reaction stage can be comprised of one or more reactors or reaction zones each of which can comprise one or more catalyst beds of the same or different bulk metal hydrotreating catalyst described above. Although other types of catalyst beds can be used, fixed beds are typically preferred. Such other types of catalyst beds include fluidized beds, ebullating beds, slurry beds, and moving beds. Interstage cooling or heating between reactors, reaction zones, or between catalyst beds in the same reactor, can be employed since some olefin saturation can take place, and olefin saturation and the hydrotreating reaction are generally exothermic. A portion of the heat generated during hydrotreating can be recovered. Where this heat recovery option is not available, conventional cooling may be performed through cooling utilities such as cooling water or air, or through use of a hydrogen quench stream. In this manner, optimum reaction temperatures can be more easily maintained.

The diesel boiling range feedstream is contacted with the above-described bulk metal hydrotreating catalyst in the reaction stage under effective hydrotreating conditions. These conditions typically include temperatures ranging from about 150° C. to about 425° C., preferably about 200° C. to about 370° C., more preferably about 230° C. to about 350° C. Typical weight hourly space velocities ("WHSV") range from about 0.1 to about 20 hr$^{-1}$, preferably from about 0.5 to about 5 hr$^{-1}$. Any effective pressure can be utilized, and pressures typically range from about 4 to about 70 atmospheres, preferably 10 to 40 atmospheres.

The contacting of the diesel boiling range feedstream with the above-described bulk metal hydrotreating catalysts produces a reaction product comprising at least a vapor product and a liquid diesel boiling range product. The vapor product typically comprises gaseous reaction products such as $H_2S$, and the liquid reaction product typically comprises a liquid diesel boiling range product having a reduced level of nitrogen, aromatics, and sulfur contaminants. Thus, it is typically preferred to separate the vapor product and the liquid diesel boiling range product, and recover the liquid diesel boiling range product. The method of separating the vapor product from the liquid diesel boiling range product is generally accomplished by any means known to be effective at separating gaseous and liquid reaction products. For example, a stripping tower or reaction zone can be used to separate the vapor product from the liquid diesel boiling range product. The diesel boiling range product thus recovered will have a sulfur concentration lower than that of the diesel boiling range feedstream, and will preferably have a sulfur level low enough to meet regulatory requirements imposed at the time or production.

The above description is directed to several embodiments of the present invention. Those skilled in the art will recognize that other embodiments that are equally effective could be devised for carrying out the spirit of this invention.

The following examples will illustrate the improved effectiveness of the present invention, but are not meant to limit the present invention in any fashion.

EXAMPLES

Example 1

The unexpected results achieved by utilizing a Nb-containing catalyst as described above was illustrated by comparing the hydrotreating activity of CoMoNb catalysts to a commercial supported hydrotreating catalyst. The commercial hydrotreating catalyst was obtained from Akzo Nobel and is marketed as KF-757. The weight percent and molar ratio of each element of the bulk metal hydrotreating catalysts used in this experiment are contained in Table 1 below. It should be noted that the molar ratios contained in Table 1 exclude oxygen.

TABLE 1

| CoMoNb Bulk Hydrotreating Catalyst Compositions | | | | | |
|---|---|---|---|---|---|
| Catalyst | Co (molar ratio) x | Mo (molar ratio) y | Nb (molar ratio) z | Co (wt. %) | Mo (wt. %) | Nb (wt. %) |
| CoMo | 1.50 | 1.00 | | 34.50 | 37.40 | 0.00 |
| CoMoNb | 1.50 | 0.75 | 0.25 | 34.90 | 28.40 | 9.20 |
| CoMoNb | 1.50 | 0.50 | 0.50 | 35.20 | 19.10 | 18.50 |
| CoMoNb | 1.50 | 0.75 | 0.25 | 35.60 | 9.70 | 28.10 |
| CoNb | 1.50 | | 1.00 | 36.00 | 0.00 | 37.90 |

Each of the catalysts described in Table 1, along with the commercial hydrotreating catalyst, was evaluated for hydrodesulfurization ("HDS") activity, hydrodenitrogenation ("HDN") activity, and hydrogenation activity. A total of 6 cc of each of the catalysts was placed in a fixed bed downflow reactor and contacted with a diesel boiling range distillate having 1.6 wt. % sulfur, an API Gravity of 32.3, 100 wppm nitrogen, and an initial and final boiling point of 396° F. and 779° F., respectively. The diesel boiling range distillate and the catalysts were contacted under hydrotreating conditions including temperatures of 625° F., hydrogen treat rates of 2000 scf/bbl substantially pure hydrogen, pressures of 400 psig, and liquid hourly space velocities ("LHSV") of 1.0 hr$^{-1}$.

The HDS activity, expressed as a 1.5 order rate constant $k_{HDS}$, of each of the CoMoNb catalysts was then calculated by an apparent 1.5 order reaction respected to sulfur concentration and compared to the HDS activity of the conventional catalyst. The $k_{HDS}$ equation used was $k_{HDS}=[(1/C_p^{0.5})-(1/C_f^{0.5})]\times LHSV/0.5$. Where $C_f$ and $C_p$ are sulfur concentrations expressed as wt. % for feed and product, respectively. The results are contained in FIG. 1.

As can be seen in FIG. 1, the $Co_{1.5}Mo_{1.0}$, $Co_{1.5}Mo_{0.74}Nb_{0.25}$, and $Co_{1.5}Mo_{0.5}Nb_{0.5}$ catalysts were more active for HDS than the commercial catalyst. FIG. 1 also demonstrates that the Nb promoted $Co_{1.5}Mo_{0.74}Nb_{0.25}$, and $Co_{1.5}Mo_{0.5}Nb_{0.5}$ catalysts were the most active for HDS.

The HDN activity, expressed as a 1.5 order rate constant $k_{HDN}$, of each of the CoMoNb catalysts was then calculated by an apparent 1.5 order reaction respected to sulfur concentration and compared to the HDN activity of the conventional catalyst. The $k_{HDS}$ equation used was $k_{HDN}=LHSV\times Ln(C_f/C_p)$. Where $C_f$ and $C_p$ are nitrogen concentrations expressed as wppm for feed and product, respectively. The results are contained in FIG. 2.

Figure 2:
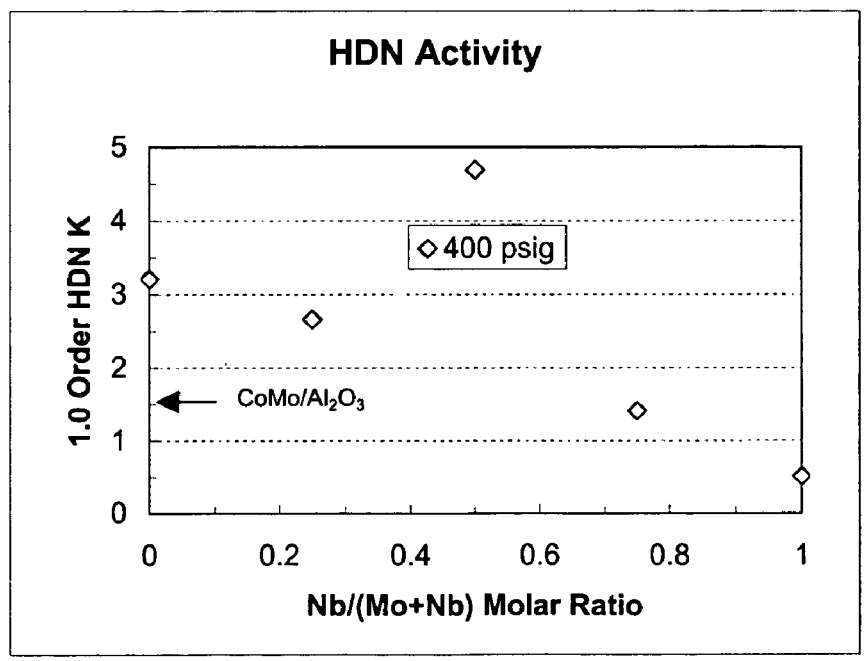
FIG. 2 compares the hydrodenitrogenation activity of various CoMoNb bulk hydrotreating catalysts to the hydrodenitrogenation activity of a commercial hydrotreating catalyst.

As can be seen in FIG. 2, the $Co_{1.5}Mo_{1.0}$, $Co_{1.5}Mo_{0.74}Nb_{0.25}$, and $Co_{1.5}Mo_{0.5}Nb_{0.5}$ catalysts were more active for HDN than the commercial catalyst. FIG. 2 also demonstrates that the Nb promoted $Co_{1.5}Mo_{0.74}Nb_{0.25}$, and $Co_{1.5}Mo_{0.5}Nb_{0.5}$ catalysts were the most active for HDN.

The hydrogenation activity of each catalyst, expressed as API gravity, was then calculated and compared to the hydrogenation activity of the commercial catalyst. API gravity is a reliable method of comparing hydrogenation activity because it is known that the hydrogenation of aromatics will increase the API gravity of a hydrocarbon stream. The results are contained in FIG. 3. It should be noted that the hydrogenation activity is expressed in terms of the API density of the desulfurized product.

Figure 3:
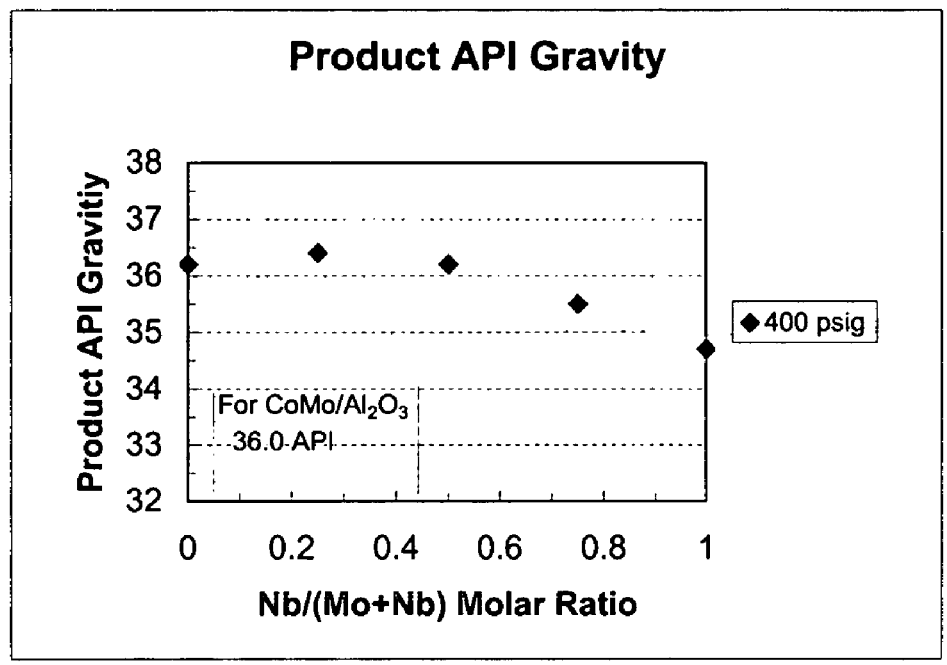
FIG. 3 compares the hydrogenation activity of various CoMoNb bulk hydrotreating catalysts to the hydrogenation activity of a commercial hydrotreating catalyst.

As can be seen in FIG. 3, the $Co_{1.5}Mo_{1.0}$, $Co_{1.5}Mo_{0.74}Nb_{0.25}$, and $Co_{1.5}Mo_{0.5}Nb_{0.5}$ catalysts were more active for hydrogenation than the commercial catalyst. FIG. 3 also demonstrates that the Nb promoted $Co_{1.5}Mo_{0.74}Nb_{0.25}$, and $Co_{1.5}Mo_{0.5}Nb_{0.5}$ catalysts were the most active for hydrogenation.

Example 2

The unexpected results achieved by utilizing a Nb-containing catalyst as described above was illustrated by comparing the hydrotreating activity of CoNiMoNb hydrotreating catalysts having a compositional formula of $Co_aNi_bMO_cNb_d$, wherein a, b, c, and d are the respective molar ratios of each component, to a commercial supported hydrotreating catalyst, also. The commercial hydrotreating catalyst was obtained from Akzo Nobel and is marketed as KF-757. The weight percent of each element of the bulk metal hydrotreating catalysts used in this experiment are contained in Table 2 below.

TABLE 2

CoNiMoNb Bulk Hydrotreating Catalyst Compositions

| Catalyst | Co (molar ratio) a | Ni (molar ratio) b | Mo (molar ratio) c | Nb (molar ratio) d | Co (wt. %) | Ni (wt. %) | Mo (wt. %) | Nb (wt. %) |
|---|---|---|---|---|---|---|---|---|
| CoNiMo | 0.75 | 0.25 | 1.00 | 0.00 | 20.60 | 6.80 | 44.79 | 0.00 |
| CoNiMoNb | 0.20 | 1.00 | 0.50 | 0.50 | 7.50 | 27.30 | 46.19 | 14.90 |

Each of the catalysts described in Table 2, along with the commercial hydrotreating catalyst, was evaluated for hydrodesulfurization ("HDS") activity, hydrodenitrogenation ("HDN") activity, and hydrogenation activity. A total of 6 cc of each of the catalysts was placed in a fixed bed downflow reactor and contacted with the same diesel boiling range distillate used in Example 1 above. The diesel boiling range distillate and the catalysts were contacted under hydrotreating conditions including temperatures of 625° F., hydrogen treat rates of 2000 scf/bbl substantially pure hydrogen, pressures of 400 psig, and liquid hourly space velocities ("LHSV") of 1.0 $hr^{-1}$.

The HDN and HDN activity of the CoNiMo catalyst was then calculated as described above, and compared to the HDS and HDN activity of the commercial catalyst. The results are contained in FIG. 4.

Figure 4:
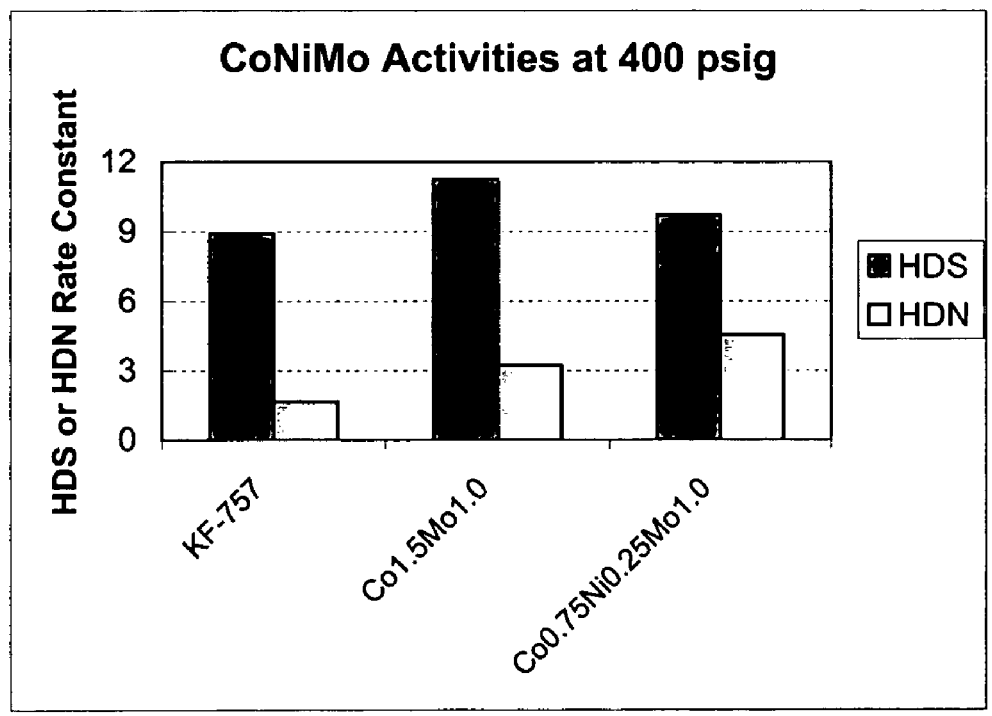
FIG. 4 compares the hydrodesulfurization and hydrodenitrogenation activity of a CoNiMo bulk hydrotreating catalyst to the hydrodesulfurization activity of a commercial hydrotreating catalyst and a CoMo bulk hydrotreating catalyst.

As can be seen in FIG. 4, compared to $Co_{1.5}M_{1.0}$, $Co_{0.75}Ni_{0.25}Mo_{1.0}$ was more active for denitrogenation but less active for desulfurization (FIG. 4). However, it was more active than the commercial hydrotreating catalyst.

The HDN and HDN activity of the CoNiMoNb catalyst was then calculated as described above, and compared to the HDS and HDN activity of the commercial catalyst. The results are contained in FIG. 5.

Figure 5:
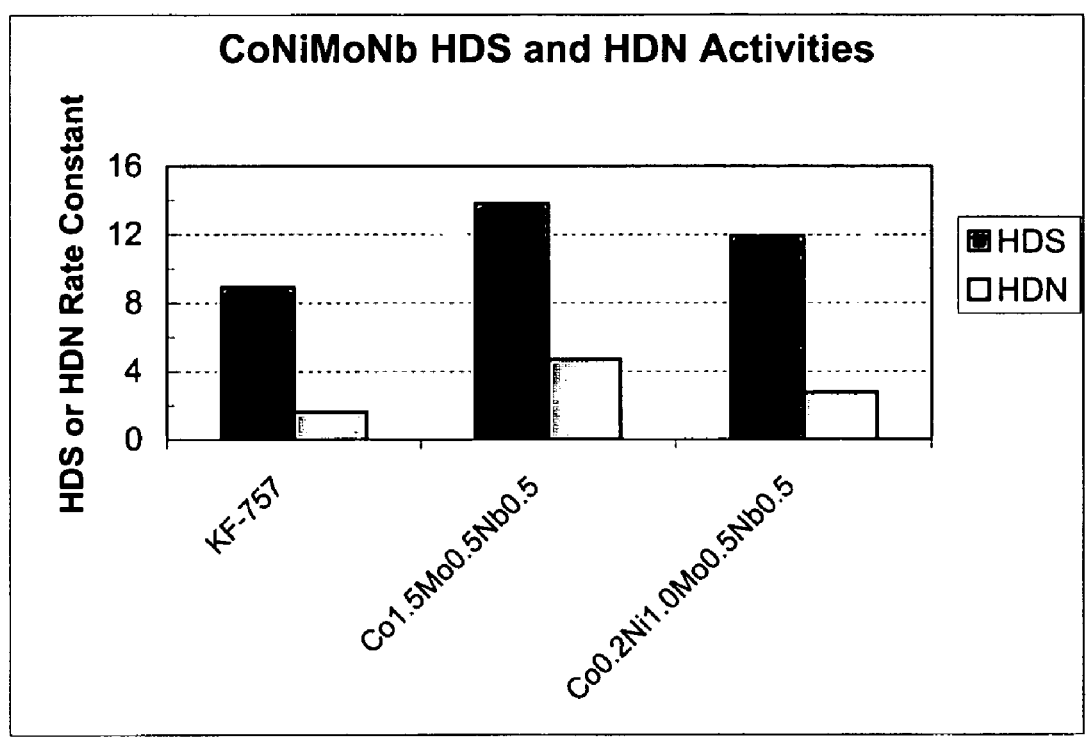
FIG. 5 compares the hydrodesulfurization and hydrodenitrogenation activity of a CoNiMoNb bulk hydrotreating catalyst to the hydrodesulfurization activity of a commercial hydrotreating catalyst and a CoMoNb bulk catalyst.

As can be seen in FIG. 5, compared to $Co_{1.5}Mo_{0.5}Nb_{0.5}$, $Co_{0.2}Ni_{1.0}Mo_{0.5}Nb_{0.5}$ was less active for both desulfurization and denitrogenation. However, it was still more active than the KF-757 commercial catalyst.

The invention claimed is:

1. A bulk metal diesel-boiling-range hydrotreating catalyst in the oxide state consisting essentially of $Mo_xCo_yNb_z$, excluding the oxygen, wherein x, y, and z represent about 0.1 to about 2 moles of Mo, about 0.5 to about 2 moles of Co, and about 0.1 to about 2 moles of Nb, and wherein Nb is present in amounts from about 2 to about 45 wt. %, Mo is present in amounts from about 1 to about 50 wt. %, and Co is present in amounts from about 10 to about 45 wt. %, calculated as oxides, based on the total weight of the bulk metal hydrotreating catalyst.

2. The bulk metal hydrotreating catalyst according to claim 1 wherein the Co and Mo metals comprise from about 50 wt. % to about 100 wt. %, calculated as oxides, of the total weight of the bulk metal hydrotreating catalyst.

3. The bulk metal hydrotreating catalyst according to claim 1 wherein Nb is present in amounts from 10 to about 35 wt. %, Mo is present in amounts from about 10 to about 40 wt. %, and Co is present in amounts from about 20 to about 40 wt. %.

4. The bulk metal hydrotreating catalyst according to claim 3 wherein x, y, and z represent about 0.2 to about 1.5 moles of Mo, about 0.8 to about 1.5 moles of Co, and about 0.2 to about 1.5 moles of Nb.

5. The bulk metal hydrotreating catalyst according to claim 1 wherein Nb is present in amounts from 15 to about 20 wt. %, Mo is present in amounts from about 15 to about 30 wt. %, and Co is present in amounts from about 30 to about 40 wt. %.

6. The bulk metal hydron-eating catalyst according to claim 5 wherein x, y, and z represent about 0.2 to about 0.8 moles of Mo, about 0.8 to about 1.5 moles of Co, and about 1 to about 1.5 moles of Nb.

7. A bulk metal diesel-boiling-range hydrotreating catalyst in the oxide state having a composition of $Mo_xCo_yNb_z$, excluding the oxygen, wherein x, y, and z represent about 0.1 to about 2 moles of Mo, about 0.5 to about 2 moles of Co, and about 0.1 to about 2 moles of Nb, and wherein Co is present in amounts from about 10 to about 45 wt. %, Mo is present in amounts from about 1 to about 50 wt. %, and Nb is present in amounts from about 2 to about 45 wt. %, calculated as oxides, based on the total weight of the bulk metal hydrotreating catalyst.

8. The bulk metal hydrotreating catalyst according to claim 7 wherein the Co and Mo metals comprise from about 50 wt. % to about 100 wt. %, calculated as oxides, of the total weight of the bulk metal hydrotreating catalyst.

9. The bulk metal hydrotreating catalyst according to claim 7 wherein Nb is present in amounts from 10 to about 35 wt. %, Mo is present in amounts from about 10 to about 40 wt. %, and Co is present in amounts from about 20 to about 40 wt. %.

10. The bulk metal hydrotreating catalyst according to claim 9 wherein x, y, and z represent about 0.2 to about 1.5 moles of Mo, about 0.8 to about 1.5 moles of Go, and about 0.2 to about 1.5 moles of Nb.

11. The bulk metal hydrotreating catalyst according to claim 7 wherein Nb is present in amounts from 15 to about 20 wt. %, Mo is present in amounts from about 15 to about 30 wt. %, and Co is present in amounts from about 30 to about 40 wt. %.

12. The bulk metal hydrotreating catalyst according to claim 11 wherein x, y, and z represent about 0.2 to about 0.8 moles of Mo, about 0.8 to about 1.5 moles of Go, and about 1 to about 1.5 moles of Nb.

13. A bulk metal diesel-boiling-range hydrotreating catalyst in the oxide state having a composition of $Mo_xCo_yNb_z$, excluding the oxygen, wherein x, y, and z represent about 0.2 to about 1.5 moles of Mo, about 0.8 to about 1.5 moles of Go, and about 0.2 to about 1.5 moles of Nb, wherein Co is present in amounts from about 20 to about 40 wt. %, Mo is present in amounts from about 10 to about 40 wt. %, and Nb is present in amounts from about 10 to about 35 wt. %, and wherein the Co and Mo metals comprise from about 50 wt. % to about 100 wt %, calculated as oxides, of the total weight of the bulk metal hydrotreating catalyst.

14. The bulk metal hydrotreating catalyst according to claim 13 wherein Nb is present in amounts from 15 to about 20 wt. %, Mo is present in amounts from about 15 to about 30 wt. %, and Co is present in amounts from about 30 to about 40 wt. %.

15. The bulk metal hydrotreating catalyst according to claim 14 wherein x, y, and z represent about 0.2 to about 0.8 moles of Mo, about 0.8 to about 1.5 moles of Co, and about 1 to about 1.5 moles of Nb.

16. A bulk metal diesel-boiling-range hydrotreating catalyst in the oxide state having a composition of $Mo_xCo_yNb_z$, excluding the oxygen, wherein x, y, and z represent about 0.2 to about 0.8 moles of Mo, about 0.8 to about 1.5 moles of Go, and about 1 to about 1.5 moles Mb, wherein Co is present in amounts from about 30 to about 40 wt, %, Mo is present in amounts from about 15 to about 30 wt. %, and Nb is present in amounts from about 15 to about 20 wt. %, and wherein the Co and Mo metals comprise from about 50 wt. % to about 100 wt. %, calculated as oxides, of the total weight of the bulk metal hydrotreating catalyst.

* * * * *